United States Patent
Seing et al.

(10) Patent No.: US 6,947,242 B2
(45) Date of Patent: Sep. 20, 2005

(54) APPARATUS AND METHOD FOR DYNAMIC FLY HEIGHT ADJUSTMENT

(75) Inventors: Hong S. Seing, San Jose, CA (US); Bob C. Robinson, Hollister, CA (US); Ullal Vasant Nayak, San Jose, CA (US); Carl Robert Mendel, Santa Clara, CA (US); Wesley LeRoy Hillman, Morgan Hill, CA (US); Tony Mello, San Jose, CA (US); Steven Harry Voss, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 387 days.

(21) Appl. No.: 10/123,719

(22) Filed: Apr. 16, 2002

(65) Prior Publication Data

US 2003/0193734 A1 Oct. 16, 2003

(51) Int. Cl.⁷ .............................................. G11B 21/02
(52) U.S. Cl. ........................... 360/75; 360/25; 324/210
(58) Field of Search .............................. 360/25, 31, 75; 73/104, 105; 324/212, 210

(56) References Cited

U.S. PATENT DOCUMENTS

| | | | |
|---|---|---|---|
| 4,902,971 A | | 2/1990 | Guzik et al. .................. 324/212 |
| 5,313,352 A | | 5/1994 | Chikazawa et al. .......... 360/103 |
| 5,339,702 A | | 8/1994 | Viches ........................ 73/865.9 |
| 5,423,207 A | | 6/1995 | Flechsig et al. ............... 73/104 |
| 5,491,413 A | | 2/1996 | Guzik .......................... 324/212 |
| 5,689,057 A | * | 11/1997 | Baumgart et al. ............. 73/1.01 |
| 5,801,531 A | | 9/1998 | Viches et al. ................. 324/212 |
| 5,825,180 A | | 10/1998 | Guzik .......................... 324/212 |
| 5,936,807 A | | 8/1999 | Fukawa et al. ............... 360/105 |
| 5,986,451 A | | 11/1999 | Kagan .......................... 342/210 |
| 6,178,157 B1 | * | 1/2001 | Berg et al. ................... 369/300 |
| 6,568,252 B1 | * | 5/2003 | Boutaghou .................... 73/104 |
| 6,611,401 B1 | * | 8/2003 | Burga et al. ............... 360/236.9 |
| 6,667,844 B1 | * | 12/2003 | Yao et al. ...................... 360/75 |
| 6,707,646 B2 | * | 3/2004 | Berger et al. ............. 360/294.7 |
| 2003/0086197 A1 | * | 5/2003 | Baumgartner et al. ........ 360/75 |

FOREIGN PATENT DOCUMENTS

| | | | |
|---|---|---|---|
| JP | 62-21084 | 1/1987 | ........... G01R/33/12 |
| JP | 1-98101 | 4/1989 | ............ G11B/5/00 |
| JP | 3-212808 | 9/1991 | ............ G11B/5/53 |
| JP | 5-135359 | 6/1993 | ............ G11B/5/84 |
| JP | 5-197951 | 8/1993 | ............ G11B/5/84 |
| JP | 6-309636 | 11/1994 | ........... G11B/5/455 |

OTHER PUBLICATIONS

"Improved Glide Test of Thin Film Disks Using a BIMORPH Piezoelectric Transducer, Small Glide Head", IBM Technical Disclosure Bulletin, vol. 36 No. 11, Nov. 1993, pp. 265–267.

"Device for Dynamically Altering Slider Flying Height", IBM Technical Bulletin, vol. 34 No. 5, Oct. 1991, pp. 400–401.

"One Step Burnish Mapping", Research Disclosure, 33857, Jun. 1992.

"Method to Control Glider Head Flyheight vs Radius Profile", Research Disclosure, Nov. 1990, No. 319.

"Closed Loop Optimal Tandem Burnish/Glide Process with Variable Load", Research Disclosure, Nov. 1988, No. 295.

\* cited by examiner

*Primary Examiner*—Andrew L. Sniezek
(74) *Attorney, Agent, or Firm*—Kunzler & Associates

(57) ABSTRACT

Disclosed is an apparatus and method for dynamic fly height and roll adjustment of a physical asperity sensor (PAS) head. The PAS head is used to test disk asperity heights and mechanical interference (commonly known as glide height and take off height). The PAS may be adjusted through a pivoting device such as a joystick coupled through one or more actuators to the pivoting device by actuator arms. In one embodiment, the actuator is a piezoelectric motor. The PAS head may utilize a detector to indicate the distance of the disk asperity from the PAS head. The method comprises receiving the signal and in response, operating the actuators to adjust the position of the pivoting device to obtain a selected positioning of either the fly height or the roll of the PAS.

19 Claims, 8 Drawing Sheets

APPARATUS AND METHOD FOR DYNAMIC FLY HEIGHT ADJUSTMENT

BACKGROUND OF THE INVENTION

1. The Field of the Invention

The invention relates to physical asperity testing of disk drive systems. More specifically, the present invention relates to manners of improving disk drive physical asperity testing by exact calibration of disk drive testing systems.

2. The Relevant Art

Computer systems generally utilize auxiliary storage devices onto which data can be written and from which data can be read for later use. A direct access storage device is a common auxiliary storage device which incorporates rotating magnetic disks for storing data in magnetic form on concentric, radially spaced tracks on the disk surfaces. Transducer heads driven in a path generally perpendicular to the drive axis are used to write data to the disks and to read data from the disks. Many aspects of development and manufacturing in the disk drive industry are involved in the effort to produce the most reliable direct access storage device possible while maintaining a reasonable price. These efforts include design, component selection, development tests, and manufacturing tests. Once produced, disks are generally submitted to a variety of manufacturing tests. For instance, a series of testing operations are typically carried out on each disk. These operations may be conducted at a common station, or the disk may be transported to different stations to perform the specified operation.

One such operation involves conditioning the disk surface. The conditioning involves abrasive objects wiping or dragging across the surface of the disk. The purpose of this operation is to remove any residue or physical asperities. A further operation is a glide height test. The glide height is the height of a flying head sensor over the surface of the disk. The glide height is measured with the use of a test head gimble assembly (HGA) flying above the disk. In manufacturing, the designated glide height is designated to be at a height of or above the highest asperity on the disk. To determine the glide height, a speed sensitive HGA is used to gauge the height of the asperities on the disk surface. The actual fly-height of the HGA is critical for gauging the height of the asperities. A further operation that is frequently conducted on the disk is a magnetic test in which the magnetic coating of the disk is tested.

The disk drive industry has been engaged in an ongoing effort to increase the densities of hard disk drives. The ultrahigh densities have allowed the disk drive industry to continually miniaturize disk drives. A common problem inherent to ultrahigh densities is the fly height of the read/write head. As the density is increased, the fly height of the read/write head is reduced. If the glide height is greater than the desired fly height, the read/write head's capability to accurately and reliably read and write data will be diminished. Thus, the glide height becomes an important measurement of the quality of the disk. In fact, glide testing is a critical test that is generally performed on all disks produced.

Glide testing detects the asperities and other abnormalities that are detrimental to the performance and reliability of the disk drive. FIG. 1 shows a schematic representation of a glide height calibration test apparatus 100 of the prior art. Shown therein are a disk 102, an HGA 104, and a calibrated asperity 106. The HGA 104 is velocity sensitive, or in other terms, the fly height of HGA 104 is dependent on the linear velocity of the disk 102. In order to determine the fly height, the velocity of the disk is reduced until the slider attached at the end of the HGA 104 makes contact with the calibrated asperity 106. A small piezoelectric ceramic crystal (not shown) is coupled to the slider. When interface is made between the calibrated asperity 106 and the slider of the HGA 104, the interface is translated into an electrical signal by the piezoelectric ceramic, and the signal is transmitted to a controlling device (not shown). At that point the fly height is calibrated to the height of the calibrated asperity 106. This is the point at which the glide height is set for the tested disk drive.

FIG. 2a illustrates the fly height 206 of a slider 105 attached to HGA 104, which is the distance between the disk 102 and the slider 105. Typically, the fly height 206 is measured from the center rail trailing edge (CRTE) of the slider 105. A fly height determination is illustrated in FIG. 2c.

FIG. 2b illustrates an additional aspect of the glide calibration test. Shown therein is a simplified schematic block diagram illustrating the roll 208 of the slider 105. The roll 208 is defined as the difference in fly heights from one edge of the slider 105 to the opposing edge of the slider 105. For example, the left side fly height might be 22 nm and the right side might be 16 nm, resulting in a roll of 6 nm.

Several problems have arisen from calibrating the glide height in the manufacturing process. One problem associated with the glide test is the inability to measure the fly height accurately due to inadequate measurement tool accuracy and repeatability. The current process includes multiple optical fly height measurements and repeated adjustment of parts to meet the optimal fly height specification. One of the adjustments is a mechanical adjustment of the suspension of the HGA 104. This form of adjustment consequently can cause damage and yield fallout. Additionally, certain components can become unstable after adjustment and begin to creep back to their original mechanical state.

Furthermore, the manufacturing time required to perform the optical measurement and adjustment process is extensive, and the yield fallout due to the handling and the adjustment is costly. The resulting variation of fly height can be very large. With such a large variation, the calibration of the glide height results in a significant yield fallout and adds to the uncertainty of the actual fly height.

The roll 208 of FIG. 2b is critical to the testing process, because 100% of the surface of the disk 102 must be tested for physical asperities 106. Problems arise when the entire surface of the slider 105 is not utilized during the glide calibration test. If the slider 105 is not positioned perfectly level (a roll of 0 nm) then the entire surface of the slider is not available for the testing procedure. For example, for a given width of the physical asperity sensing (PAS) sensor of the slider 105, potentially only a fraction of that width is utilized in the scan of the disc 102. Accordingly, instead of incrementing the path of the slider 105 by its full width every revolution, the slider 105 is only incremented by the fraction of the width in each revolution of the disc. This inefficient arrangement results in increased testing time.

Properly determining the roll is also important in accurately determining the fly height. A fly height determination 210 is illustrated in FIG. 2c. The fly height is the height of the slider 105 above the disk surface 102 at a given velocity.

Thus, it can be seen from the above discussion that there is a need existing in the art for an improved fly height adjustment and calibration method and apparatus. Particularly, it would be advantageous to provide a fly height calibration apparatus that also has the ability to eliminate the roll of the HGA and to define the fly height of the HGA with high accuracy.

OBJECTS AND BRIEF SUMMARY OF THE INVENTION

The apparatus and method of the present invention have been developed in response to the present state of the art, and in particular, in response to the needs of improving the art to meet the demands of lower glide height and improved testing accuracy not yet fulfilled by currently available disk drive testing systems. Accordingly, it is an overall object of the present invention to provide a disk drive testing systems that overcomes many or all of the above-discussed shortcomings in the art.

To achieve the foregoing object, and in accordance with the invention as embodied and broadly described herein in the preferred embodiments, an improved physical asperity sensor (PAS) is provided. In one embodiment an actuator for calibrating the fly height of the physical asperity sensing (PAS) head is provided. Under a preferred embodiment of the present invention, a second actuator for calibrating the roll of the PAS head is provided.

In one embodiment the apparatus further comprises a removable mount plate coupled to the PAS head, and a joystick rotatably coupled to the mount plate through a fixed hemisphere. The joystick is configured to dynamically set the fly height and roll of the PAS head upon application of the proper force by the actuators. Preferably, pivot arms couple the first and second actuators to the joystick.

A method for exactly calibrating a physical asperity sensing head is also provided. Under a preferred embodiment of the present invention, the method comprises providing a PAS head, finely calibrating the fly height of the PAS head, and receiving feedback from a calibrated asperity. In one embodiment, the method also comprises calibrating the roll of the PAS head. Preferably, the fly height and roll of the PAS head are dynamically adjusted. In order to finely adjust the fly height and the roll, the joystick is rotated within the mount plate by application of force from the actuators. The actuators are, in turn, powered and controlled by a standard micro controller such as the Intel 8052 manufactured by Intel of Santa Clara, Calif.

In one embodiment, finely calibrating the fly height of the PAS head comprises the first actuator modifying the position of the joystick by altering the placement of the first pivot arm in a horizontal direction, and finely calibrating the roll of the PAS head by the second actuator modifying the position of the joystick by altering the placement of the second pivot arm in a vertical direction. Under a preferred embodiment of the present invention, a calibrated asperity is utilized in order to exactly define the fly height and roll of the PAS head. Preferably, utilizing the calibrated asperity further comprises adjusting the fly height of the PAS head until sensing contact between the PAS head and the calibrated asperity with the PAS head, and adjusting the roll of the PAS head until the PAS head makes contact with the calibrated asperity occurs at the same fly height.

The method and apparatus of the present invention are suitable for use with all testing and processing operations where fly height control is critical.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 3:
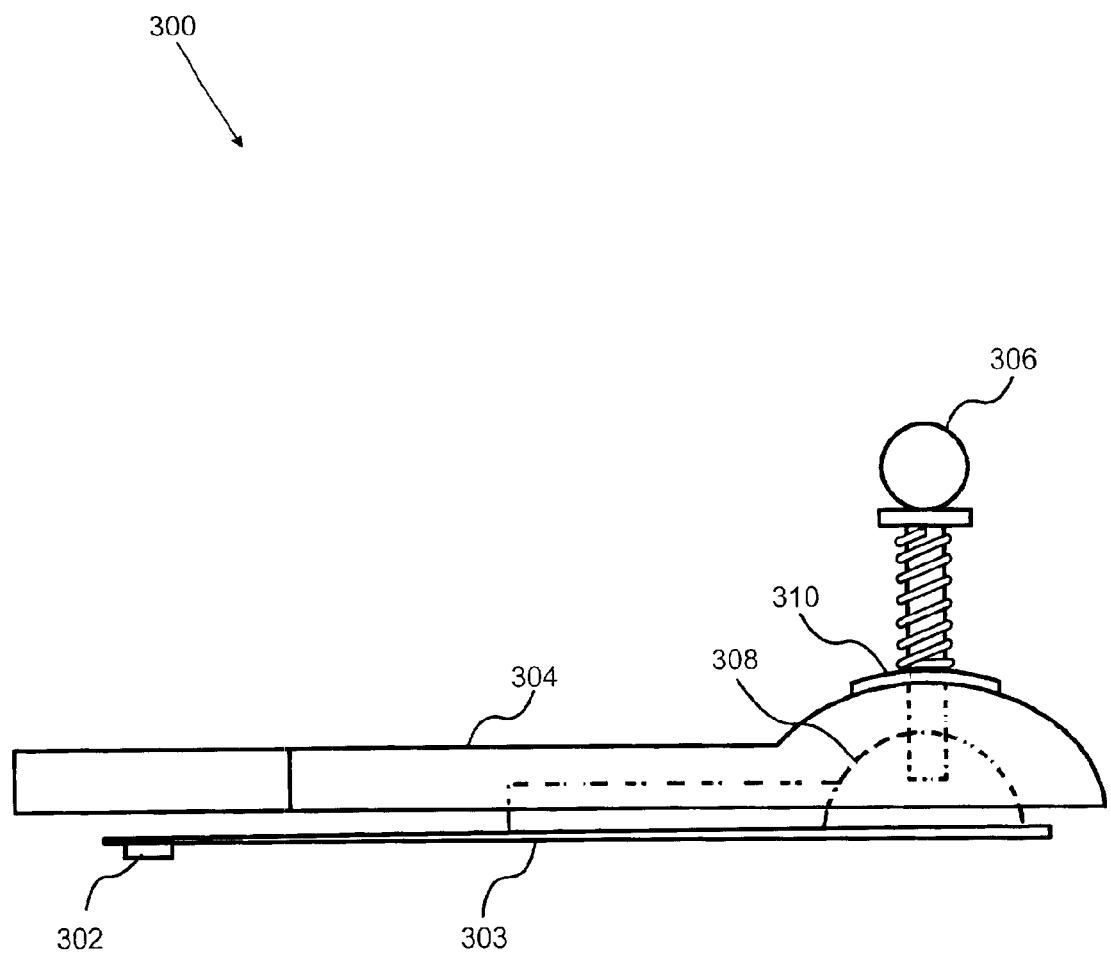
FIG. 3 is a simplified schematic block diagram illustrating a dynamic fly height adjustment device of the present invention.

Referring to FIG. 3, shown therein is a simplified schematic block diagram illustrating the concept of a dynamic fly height adjustment device 300 of the present invention. In one embodiment, the fly height adjustment device 300 comprises a physical asperity sensor (PAS) flying head 302 attached to a head gimble assembly 303 through a gimbal structure, a mounting plate 304, a pivot control device 306, a semi-spherical pivoting device 308, and a load ring 310. The PAS head 302 rides on the head gimble assembly, or HGA 303 which is shown coupled to the semi-spherical pivoting device 308. The semi-spherical pivoting device 308 is attached to the pivot control device 306 through a similarly shaped aperture in the mounting plate 304. The semi-spherical pivoting device 308 allows for fine calibrations of the PAS head 302.

Figure 2A:
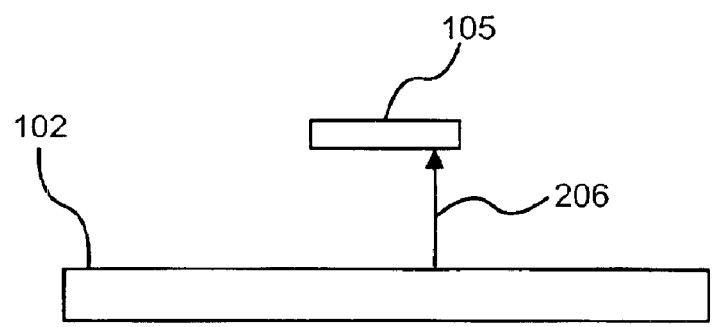
FIG. 2a is a schematic block diagram illustrating fly height.
Figure 2B:
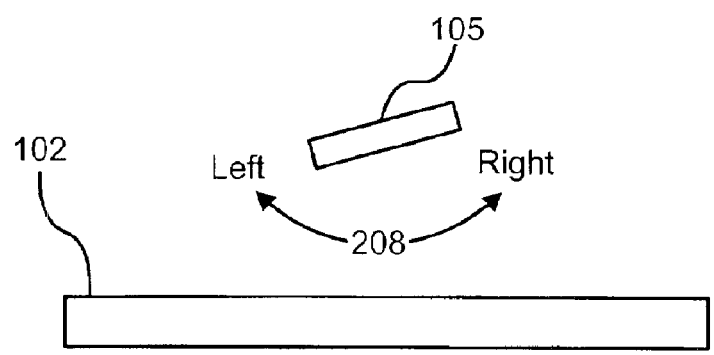
FIG. 2b is a schematic block diagram illustrating roll.
Figure 2C:
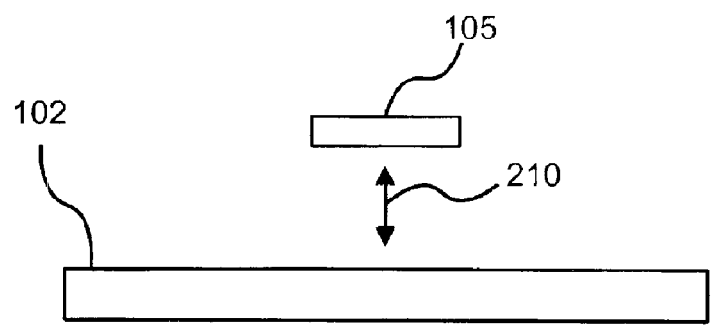
FIG. 2c is a schematic block diagram illustrating a fly height determination.

In one embodiment, the pivot control device 306 is utilized in a manner substantially equivalent to that of a joystick. With reference to FIG. 3, movement of the pivot control device 306 to the right raises the PAS head 302, while, movement of the pivot control device 306 to the left lowers the PAS head 302. Movement of the pivot control device 306 in a direction into and out of the page alters the roll of the PAS head 302, as described with reference to FIG. 2b.

Figure 4:
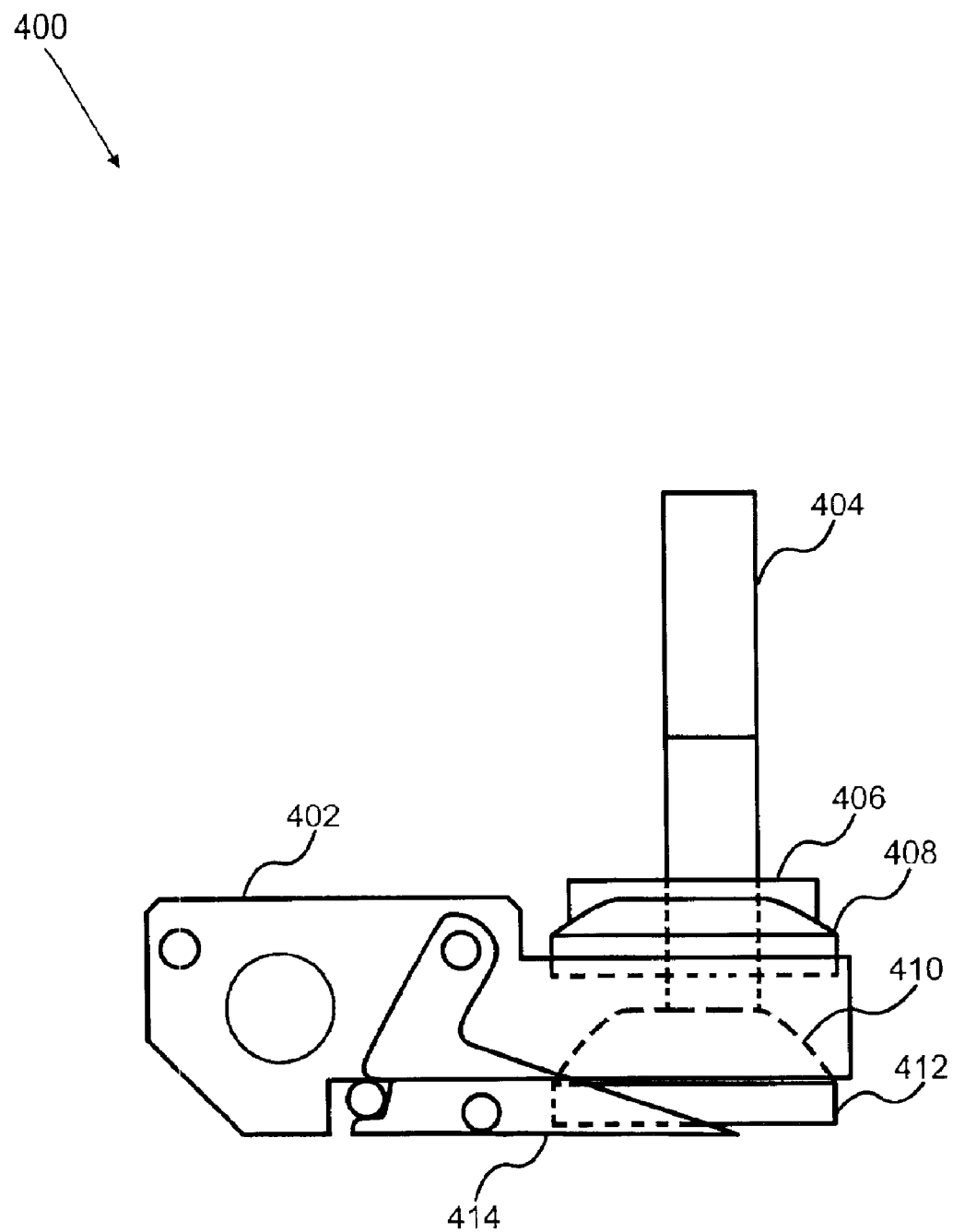
FIG. 4 is a schematic block diagram illustrating one embodiment of a physical asperity sensor (PAS) calibration device of the present invention.

FIG. 4 illustrates one embodiment of a PAS portion 400 of a calibration device of the present invention. In the depicted embodiment, the PAS calibration device 400 is modular and removable from the glide-testing device 600 of FIG. 6. As depicted, the PAS portion 400 comprises a first mounting plate 402, a pivot control device 404, a load ring 406, a first sphere 408, a second sphere 410, a second mounting plate 412, and a load/unload device 414. Preferably, the pivot control device 404 operates in a manner substantially equivalent to that of the pivot control device 306 of FIG. 3. The pivot control device is manipulated in a manner that will be described in greater detail below with reference to FIG. 6.

In operation, a movement of the pivot control device 404 to the left or the right, with reference to FIG. 4, results in a fine adjustment of the roll of the PAS head (not shown). Likewise, a movement of the pivot control device 404 in a direction moving into or out of the page allows for fine calibrations of the fly height of the PAS head. The purpose of the load ring 406 is to provide an even distribution of the force of the spring 504 to the inner and outer spheres 408 and 410. The inner and outer spheres 408 and 410 permit the movement of the pivot control device 404 within the fixed mounting plate 402.

In one embodiment, the mounting plate 412 transfers the movement of the pivot control device 404 to the PAS head (not shown). Under a preferred embodiment of the present invention, the load/unload device 414 enables the PAS head to retract to make possible the exchanging of disks to be tested. The load/unload device 414 is controlled by a load/unload rod that will be described in greater detail with reference to FIG. 6.

Figure 1:
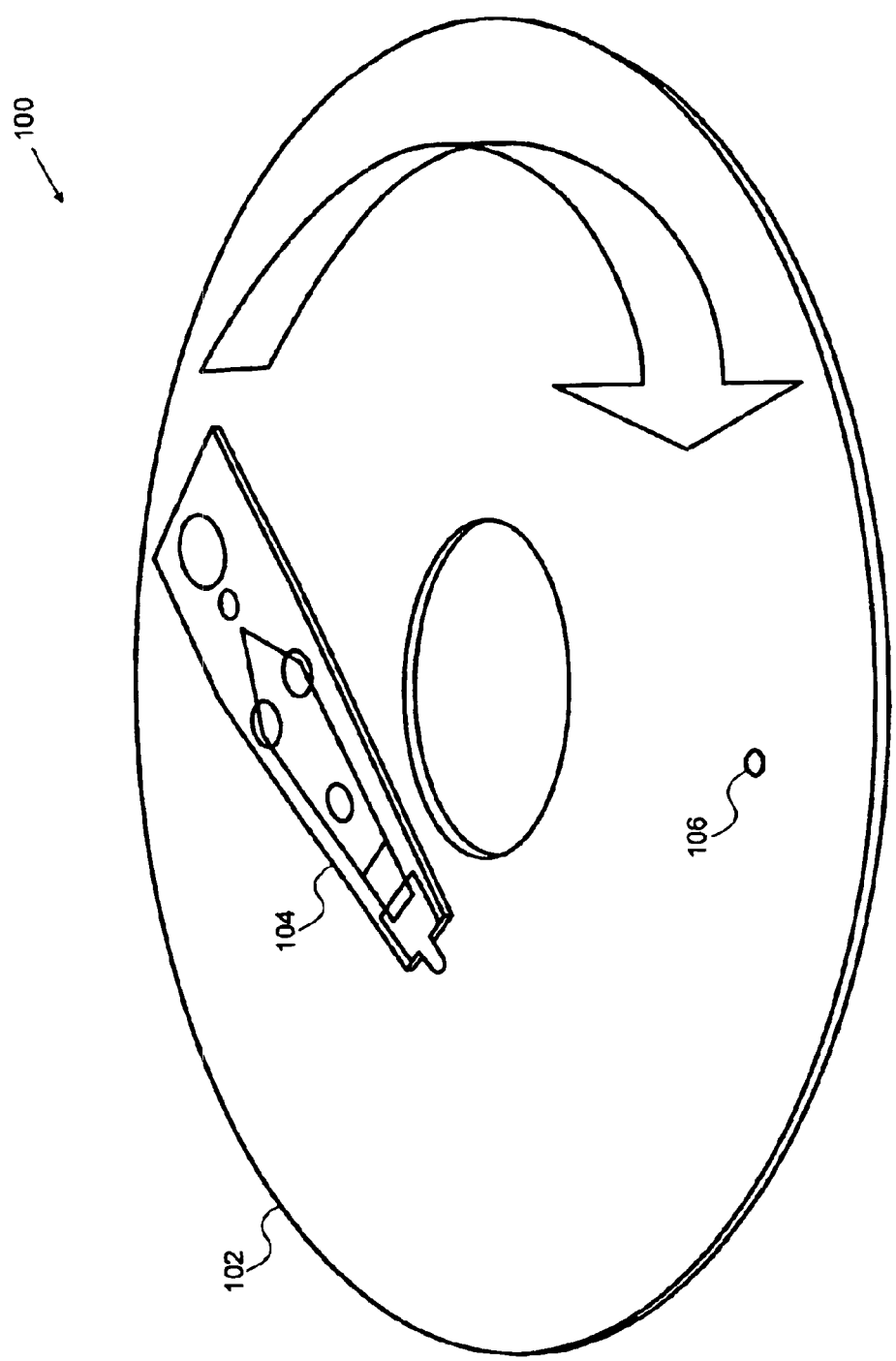
FIG. 1. is a schematic block diagram illustrating one embodiment of a conventional physical asperity test apparatus.
Figure 5:
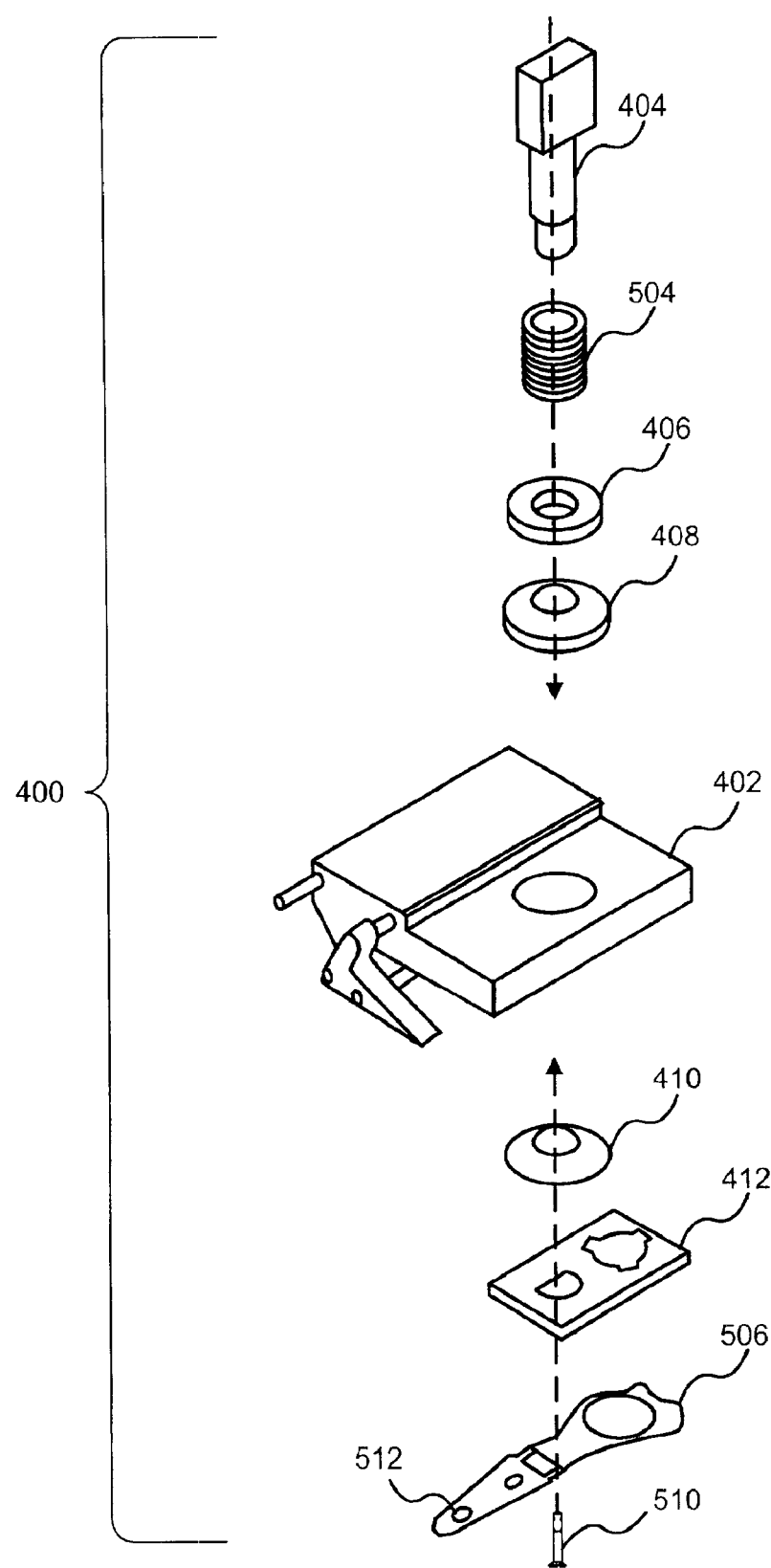
FIG. 5 is an exploded view illustrating the PAS calibration device of FIG. 4.
Figure 6:
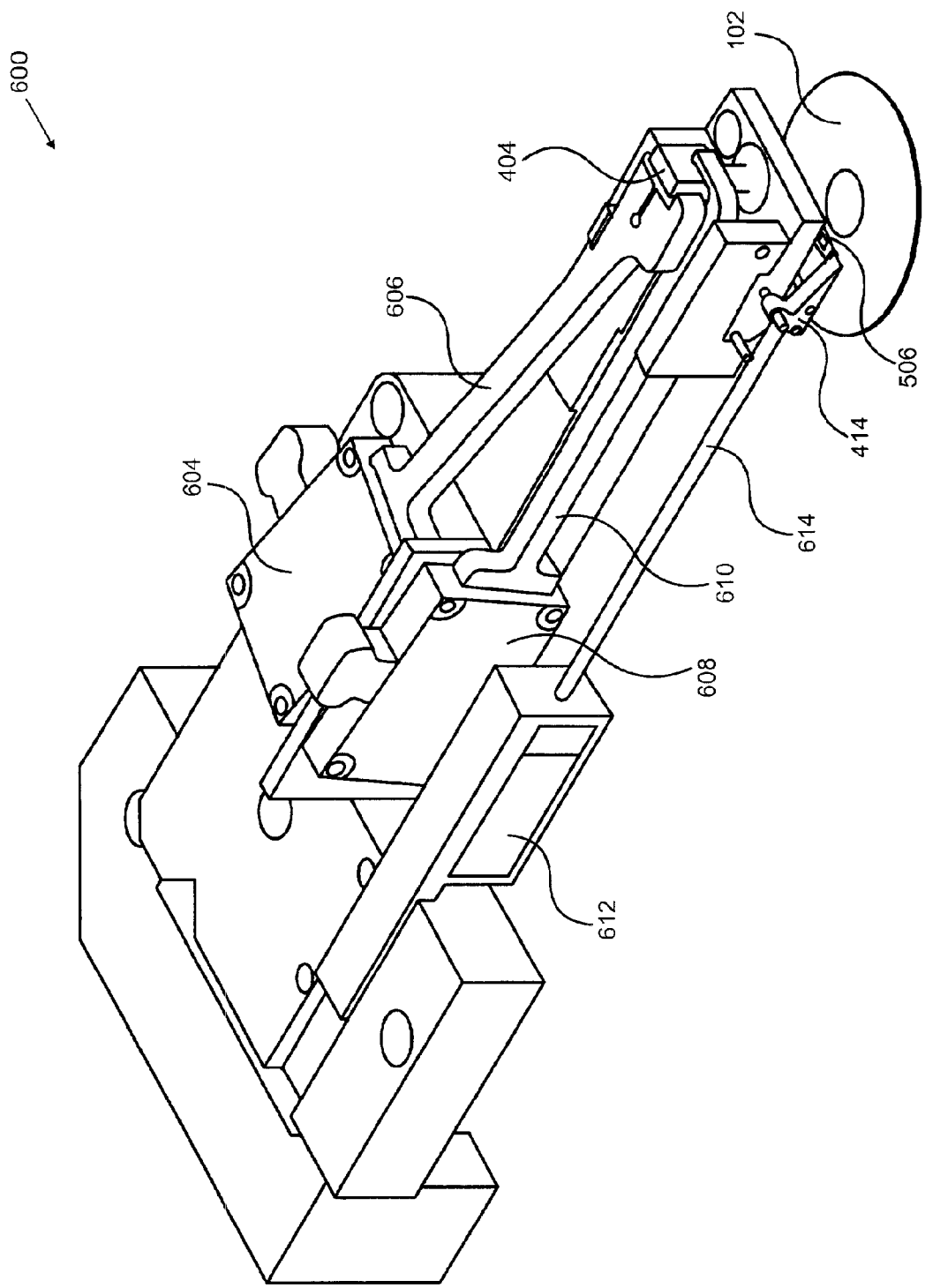
FIG. 6 is a perspective view of one embodiment of a glide testing device of the present invention.

Referring now to FIG. 5, shown therein is an exploded assembly perspective diagram of the PAS calibration device 400. A spring 504, an HGA 506, a coupling device 510, and a PAS head 512 are shown together with the components described above with reference to FIG. 4. The spring 504 causes the pivot control device 404 to rest in a position significantly perpendicular to the mounting plate 402. The HGA 506 functions in a manner substantially equivalent to the HGA 104 of FIG. 1. In one embodiment, the coupling device 510 may be a screw; alternatively the coupling device 510 may embody any suitable method to couple the components of the PAS calibration device 400. FIG. 6 is a schematic block diagram illustrating one embodiment of a glide-height calibration device 600 carrying thereon the PAS portion 400 of FIG.4 and 5. In one embodiment, the glide-height calibration device 600 is provided with the pivot control device 404, the load/unload device 414, a fly-height actuator 604, a fly-height arm 606, a roll actuator 608, a roll arm 610, a load/unload actuator 612, and a load/unload rod 614. Under a preferred embodiment of the present invention, the glide-height calibration device 600 is provided with the fly-height and roll actuators 604 and 608. Alternatively the glide-height calibration device 600 may comprise any one or more of the described control actuators.

While the fly-height and roll actuators 604 and 608 may comprise any suitable device capable of highly accurate movements, such as a servo, linear actuator, piezo stack, voice coil motor, and the like, the fly-height and roll actuators 604 and 608 preferably comprise piezoelectric precision motors. Piezoelectric precision motors are based on the piezoelectric effect, which is the relation of elastic strain and electric fields in some crystalline materials. A material or crystal that displays the piezoelectric effect becomes polarized, and the surface of the material or crystal becomes charged when a stress is applied. Conversely, if the material or crystal is subject to an electric field, the material or crystal will expand in one direction and contract in another direction.

When a sinusoidal voltage of ultrasonic frequency is applied to a small prismatic shaped piezoceramic beam, mechanical oscillations with standing waves are generated. This superposition of both a longitudinal mode and a bending mode of vibration cause the edge of the piezoceramic beam to move along a planar elliptic path. The piezoceramic beam, held in place by a spring, is positioned against a ceramic strip fixed to a carriage. Due to friction, the oscillating piezoceramic beam can apply a driving force to the carriage. Piezoelectric motors operating upon this principle are available from Nanomotion Inc. of Ronkonkoma, New York.

The fly-height actuator 604 is preferably coupled to the pivot control device 404 by means of the fly-height 606. As a position signal is received from the PAS head 512, preferably in the form of an electrical signal, the fly-height actuator 604 uses the position signal as feedback to minutely adjust the fly-height of the PAS head 512 by moving the fly-height arm 6 in the manner described above. The base of the fly-height arm 606, is adjacent the fly- height actuator 604 and acts as the carriage of the piezoelectric precision motor. Movements of the fly-height arm 606 parallel to the fly-height actuator 604 cause the pivot control device 404 to move in a pattern significantly parallel to the fly-height actuator 604. Under a preferred embodiment of the present invention, the PAS head 512 is then adjusted in either a direction closer to or away from the disk 102.

In one embodiment, the roll actuator 608 is coupled to the pivot control device 404 by means of the roll arm 610. The roll actuator 608 also receives feedback from the PAS head 512. In order to adjust the roll of the PAS head 512, the roll actuator 608 adjusts the position of the base of the roll arm 610 in direction parallel to the roll actuator 608. This movement causes the pivot control device 404 to move towards the roll actuator 608 or away from the roll actuator 608. The roll of the PAS head 512 is inherent due to forces created by the spinning disk 102. It is desirable to have the PAS head 512 positioned significantly parallel to the disk 102 (also referred to as having zero roll).

In order to achieve zero roll, the PAS head 512 is lowered until contact is made with a calibrated asperity ( 106 of FIG. 1) of predetermined size. Any suitable detection device may be used to detect the calibrated asperity. The test is performed two or more times at certain points from each edge of the PAS head 512. For example, where one side of the fly height is found to be 15 nm and the opposing side is found to have a fly height of 18 nm, there is a resulting roll of 3 nm. Tests at multiple points from edge to edge may also be used to establish the angular slope of the roll. Once the angular roll of the PAS head 512 is known, the roll actuator 608 is empowered to adjust the position of the pivot control device 404 through the roll arm 610 until there is no roll on the PAS head 512 in relation to the disk surface.

Also shown in FIG. 6 is the load/unload device 414. In order to exchange the disk 102 after testing without causing damage, the load/unload device 414 is utilized in one embodiment. The load/unload actuator 612 extends or retracts the load/unload rod 614, which in turn allows the placement and removal of the PAS head 512 from the disk surface 102 being tested. In one embodiment, the load/unload actuator 612 is a solenoid. Alternatively the load/unload actuator 612 may be a servo, or voice coil motor, or the like.

Figure 7:
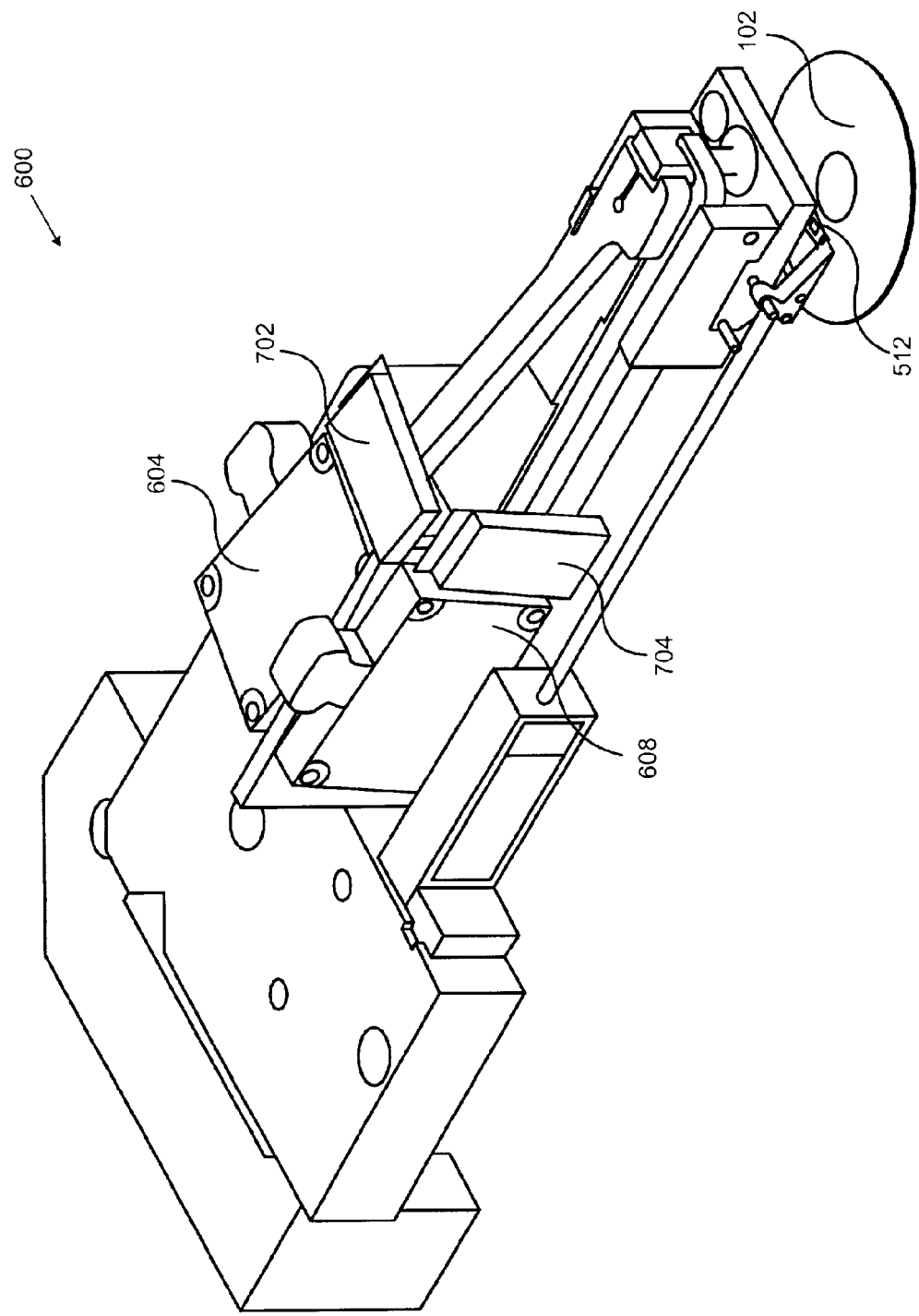
FIG. 7 is a perspective view illustrating an alternative embodiment of the glide testing device of the present invention.

Referring now to FIG. 7, shown therein is an alternative embodiment of the glide-height calibration device 600. Under the alternative embodiment of the present invention, the glide height calibration device 600 further comprises a fly-height feedback sensor 702 and a roll feedback sensor 704. The fly-height sensor 702 and the roll sensor 704 are utilized for positioning of the PAS head 512 In one embodiment, the sensors 702 and 704 are variable resistors coupled to the fly height arm 606 and the roll arm 610, and the resistance value of the sensors 702, 704 is converted to a rough location of the fly-height and roll sensors 604 and 608. This rough location is then used for the initial positioning of the PAS head 512.

In one embodiment, glide-height calibration device 600 may be implemented to simultaneously test and calibrate both sides of the disk 102. The fly height adjustment is used to calibrate the fly height 206 to be the same on both sides of the disk 102.

Figure 8:
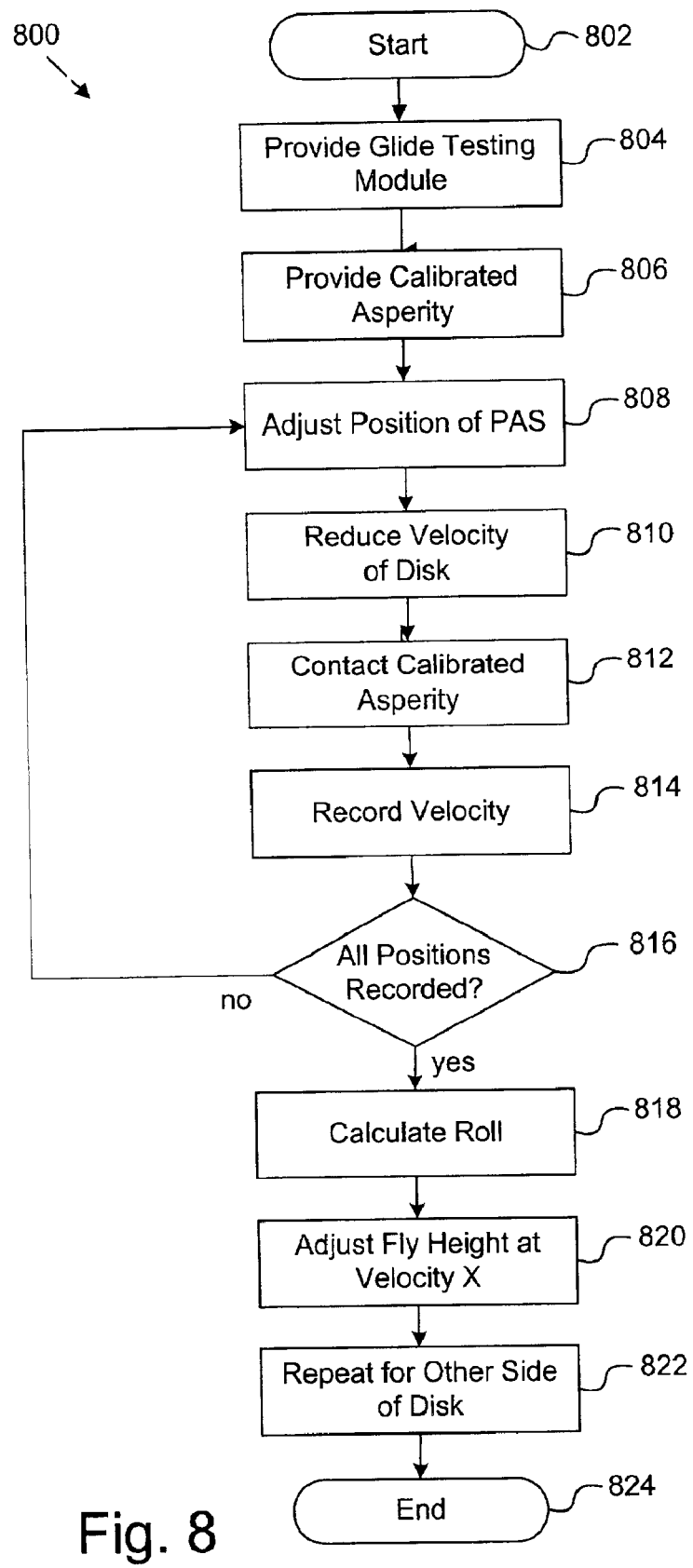
FIG. 8 is a flow chart illustrating a method for calibrating the position of a physical asperity sensor.

FIG. 8 is a schematic flow chart diagram illustrating a method 800 of calibrating the position of a PAS head 512. The method 800 starts 802 and a glide testing device 600 is provided 804. Preferably a calibrated asperity is provided 806 upon a disk such as the disk 102 of FIG 1. The disk 102 is inserted into the glide testing device 600 and the load/unload actuator 612 extends the load/unload rod 614 which in turn causes the load/unload device 414 to place 808 the PAS head 512 on the surface of the disk 102. After the disk 102 has achieved a desired linear velocity, the velocity is reduced 810 until the PAS head 512 makes contact 812 with the calibrated asperity of known dimensions.

At this point, one edge of the PAS head 512 is preferably adjusted 808 in radial position (relative to the disk) until one edge of the PAS head 512 is over the calibrated asperity. The disk velocity is reduced 810 until contact is made 812. The fly height velocity is recorded 814. The velocity is again increased to be well out of contact.

The steps 808, 810, 812, and 814 are preferably repeated for several positions of the PAS head 512. That is, redial position of the PAS head 512 is preferably adjusted 808 to other positions up to and including the position where the opposite edge is over the calibrated asperity. At each position, the velocity of contact with the calibrated asperity is recorded 814. Once it has been determined 816 that velocity data has been recorded 814 for all desired positions, the PAS roll 208 is calculated 818. In one embodiment, the PAS roll 208 is calculated 818 through linear extrapolation, using the various velocities and the relative positions of the PAS head 512 at the time the velocities were recorded 814. The roll actuator 608 is then employed to adjust the roll 208 to zero. After adjustments are made, the roll 208 may be verified with additional suitable measurements. Such measurements are well known in the art and need not be detailed here.

Subsequently, the fly height is adjusted 820 so that the PAS head 512 contacts the calibrated asperity at a determined velocity X. The method 800 is then repeated 822 on the opposite surface of the disk 102 after which the method 800 ends 824.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for calibrating a physical asperity sensing head, the apparatus comprising:

a head gimble assembly;

a physical asperity sensing head coupled to the head gimble assembly;

a first actuator operably connected via an actuator arm with the physical asperity sensing head for calibrating the fly height of the physical asperity sensing (PAS) head; and a second actuator operably connected via an actuator arm with the physical asperity sensing head for calibrating the roll of the physical asperity (PAS) head.

2. The apparatus of claim 1, wherein the first actuator comprises a piezoelectric motor.

3. The apparatus of claim 1, wherein the second actuator comprises a piezoelectric motor.

4. The apparatus of claim 1, further comprising a removable mount plate coupled to the PAS head.

5. The apparatus of claim 4, further comprising a joystick coupled to the mount plate through a fixed hemisphere.

6. The apparatus of claim 5, wherein the joystick is configured to dynamically control the fly height and roll of the PAS head.

7. The apparatus of claim 5, further comprising a first pivot arm coupled between the first actuator and the joystick.

8. The apparatus of claim 5, further comprising a second pivot arm coupled between the second actuator and the joystick.

9. The apparatus of claim 1, further comprising a plurality of positioning actuators for approximately calibrating the fly height and roll of the physical asperity sensing (PAS) head.

10. An apparatus for calibrating a physical asperity sensing head, the apparatus comprising:

a physical asperity (PAS) head;

a first piezoelectric motor for calibrating the fly height of the PAS head;

a second piezoelectric motor for calibrating the roll of the PAS head;

a removable mount plate coupled to the PAS head;

a joystick coupled to the mount plate through a fixed hemisphere;

a first pivot arm coupling the first piezoelectric motor to the joystick; and a second pivot arm coupling the second piezoelectric motor to the joystick.

11. A method for calibrating a physical asperity sensing head, the method comprising:

providing a head gimble assembly;

providing a physical asperity sensing (PAS) head coupled to the head gimble assembly;

receiving feedback at one of a first actuator and a second actuator from a calibrated asperity; and finely calibrating the fly height and roll of the PAS head according to the calibrated asperity via a first actuator configured to control fly height and a second actuator configured to control roll.

12. The method of claim 11, further comprising coarsely calibrating the position of the PAS head prior to finely calibrating the position of the PAS head.

13. The method of claim 11, wherein the fly height and roll of the PAS head are controlled dynamically.

14. The method of claim 11, further comprising providing a joystick connecting the PAS head with one of the first actuator and the second actuator; and rotating the joystick within one of the first actuator and the second actuator in order to finely calibrate the position of the PAS head.

15. The method of claim 14, where finely calibrating the fly height of the PAS heed comprises modifying the position of the joystick by altering the placement of a first pivot arm with the first actuator.

16. The method of claim 14, wherein finely calibrating the roll of the PAS head comprises modifying the position of the joystick by altering the placement of a second pivot arm with the first actuator.

17. The method of claim 14, wherein finely calibrating the position of the PAS head further comprises adjusting fly height of the PAS head until contact is made between the PAS head and the calibrated asperity.

18. The method of claim 14, wherein finely calibrating the position of the PAS head further comprises adjusting the fly height of the PAS head until contact of both edges of the PAS head with the calibrated asperity occurs at the same fly height.

19. The method of claim 14, further comprising coarsely calibrating the position of the PAS head prior to finely calibrating the position of the PAS head.

* * * * *

UNITED STATES PATENT AND TRADEMARK OFFICE
CERTIFICATE OF CORRECTION

| | | |
|---|---|---|
| PATENT NO. | : 6,947,242 B2 | Page 1 of 1 |
| APPLICATION NO. | : 10/123719 | |
| DATED | : September 20, 2005 | |
| INVENTOR(S) | : Hong S. Seing et al. | |

It is certified that error appears in the above-identified patent and that said Letters Patent is hereby corrected as shown below:

Column 3,
Line 13, "systems" should read -- system --.

Column 4,
Line 47, "head gimble" should read -- head gimbal --.

Column 4,
Line 50, "gimble" should read -- gimbal --.

Column 8,
Line 4, "gimble" should read -- gimbal --.

Column 8,
Line 6, "gimble" should read -- gimbal --.

Column 8,
Line 51, "gimble" should read -- gimbal --.

Column 8,
Line 53, "gimble" should read -- gimbal --.

Signed and Sealed this

Twenty-eighth Day of November, 2006

JON W. DUDAS
*Director of the United States Patent and Trademark Office*